(12) United States Patent
Martin-Haas et al.

(10) Patent No.: US 10,318,357 B2
(45) Date of Patent: Jun. 11, 2019

(54) EFFICIENT LOCKING MECHANISM FOR MULTIPLE OPERATIONS RIGHTS

(71) Applicant: Silicon Laboratories Inc., Austin, TX (US)

(72) Inventors: Edouard Martin-Haas, Montreal (CA); Olivier Deschambault, Verdun (CA); Jean-Francois Deschenes, Ste-Marthe-sur-le-lac (CA)

(73) Assignee: Silicon Laboratories, Inc., Austin, TX (US)

( * ) Notice: Subject to any disclaimer, the term of this patent is extended or adjusted under 35 U.S.C. 154(b) by 335 days.

(21) Appl. No.: 15/449,080

(22) Filed: Mar. 3, 2017

(65) Prior Publication Data

US 2018/0253341 A1     Sep. 6, 2018

(51) Int. Cl.
*G06F 9/44*     (2018.01)
*G06F 9/52*     (2006.01)

(52) U.S. Cl.
CPC .................... *G06F 9/526* (2013.01)

(58) Field of Classification Search
CPC ....................................................... G06F 9/44
See application file for complete search history.

(56) References Cited

U.S. PATENT DOCUMENTS

| | | | |
|---|---|---|---|
| 7,174,406 B1* | 2/2007 | Abdallah | G06F 13/1663 710/240 |
| 9,542,235 B2* | 1/2017 | Pointon | G06F 9/526 |
| 2013/0290967 A1* | 10/2013 | Calciu | G06F 9/526 718/102 |
| 2014/0115216 A1* | 4/2014 | Jacobs | G06F 12/1466 710/200 |

* cited by examiner

*Primary Examiner* — Jae U Jeon
(74) *Attorney, Agent, or Firm* — Nields, Lemack & Frame, LLC (57) ABSTRACT

A novel method of providing a locking mechanism which supports multiple operations rights is disclosed. The locking mechanism includes a policy aspect which defines which operations are allowed to access the common resource concurrently. The locking mechanism also includes the ability to allow predetermined number of tasks to access the common resource simultaneously. Furthermore, additional operations can be easily and quickly added to the mechanism.

19 Claims, 4 Drawing Sheets

| TIME | OPLOCK 100 | TASK #1 | TASK #2 | TASK #3 |
|---|---|---|---|---|
| 0 | 0000 0000 | START WRITE/GO | | |
| 1 | 1000 0000 | | | |
| 2 | 0000 0000 | END WRITE | | |
| 3 | 0000 0000 | | START READ/WAIT | |
| 4 | 0000 0001 | | WAIT | |
| 5 | 0000 0010 | | GO | |
| 6 | 0000 0010 | START WRITE/WAIT | | |
| 7 | 0000 0001 | WAIT | END READ | |
| 8 | 0000 0001 | WAIT | START READ/GO | |
| 9 | 0000 0010 | WAIT | END READ | |
| 10 | 0000 0001 | WAIT | | START READ/GO |
| 11 | 0000 0000 | GO | | |
| 12 | 0000 0000 | END WRITE | | |
| 13 | 1000 0000 | | START WRITE/WAIT | |
| 14 | 0000 0000 | | WAIT | END READ |
| 15 | 0000 0000 | | GO | |
| 16 | 1000 0000 | | | |

FIG. 5

EFFICIENT LOCKING MECHANISM FOR MULTIPLE OPERATIONS RIGHTS

FIELD

This disclosure relates to a locking mechanism to control concurrent access to a resource.

BACKGROUND

The need to control access to a common resource has been important since the advent of multi-threaded processing. Simply stated, there are situations where multiple tasks may wish to access the same resource. If one of those tasks is changing the contents of that resource, while the second task is attempting to read (or write) the contents of that resource, a race condition may occur.

Assume that there is a doubly linked list. Also assume that a first task wishes to add a new element in the middle of that list, between element 2 and element 3. To do this, the first task needs to modify the next-node link of element 2 to point to the new element. The first task also needs to modify the previous-node link of element 3 to point to the new element. Finally, the next-node link and previous-node link of the new element have to be set appropriately. Also assume that at the same time, a second task wishes to delete element 2. To do so, the second task will modify the next-node link of element 1 to point to the element pointed to by the next-node link of element 2. Similarly, it will modify the previous-node link of element 3 to point to the element pointed to by the previous-node link of element 2. Depending on the order that these various operations are performed, it is possible that the next-node link of element 1 points to the new element, while the previous-node link of element 3 still points to element 2.

To eliminate this, data structures known as locks, semaphores or mutex (mutual exclusion) have been devised. These data structures operate by allowing only one application or task to access the common resource at a time. When that task has completed its access to the common resource, the operating system is free to grant another task access to the common resource.

However, there may be times when the rigor of single access is inconvenient. For example, there is no issue in allowing multiple tasks read access to a common resource, as long as none of these tasks modify the contents of that common resource.

Therefore, it would be beneficial if there were an efficient locking mechanism that controlled access to a common resource. Further, it would be advantageous if that mechanism also implemented policy rules to maximize access to the common resource without risk of data integrity issues.

SUMMARY

A novel method of providing a locking mechanism which supports multiple operations rights is disclosed. The locking mechanism includes a policy aspect which defines which operations are allowed to access the common resource concurrently. The locking mechanism also includes the ability to allow predetermined number of tasks to access the common resource simultaneously. Furthermore, additional operations can be easily and quickly added to the mechanism.

According to one embodiment, a method of controlling access to a common resource, wherein a plurality of operations may be performed on the common resource. The method comprises providing an operation lock (OPLOCK), which is a bitmap comprising a plurality of bit fields; providing a first set of bitmaps, where the first set of bitmaps correspond to a first operation that can be performed on the common resource, wherein the first set of bitmaps comprises a first mask bitmap and a first policy bitmap, wherein the first mask bitmap defines a first bit field in the operation lock that is associated with the first operation, and the first policy bitmap defines a compatibility between the first operation and each of the plurality of operations; providing a second set of bitmaps, where the second set of bitmaps correspond to a second operation that can be performed on the common resource, wherein the second set of bitmaps comprises a second mask bitmap and a second policy bitmap, wherein the second mask bitmap defines a second bit field in the operation lock that is associated with the second operation, and the second policy bitmap defines a compatibility between the second operation and each of the plurality of operations; and determining whether a task may perform a first operation on the common resource based on values of the operation lock and the first set of bitmaps. In certain embodiments, a value of the first bit field in the operation lock is incremented when a task is granted access to the common resource to perform the first operation, and the value of the first bit field is decremented when the task previously granted access to the common resource has completed the first operation. In certain embodiments, access is granted to a task to perform the first operation if a bitwise AND of the operation lock and the first policy bitmap results in a value of 0. In certain embodiments, access is denied to a task to perform the first operation if a bitwise AND of the operation lock and the first policy bitmap results in a non-zero value. In certain embodiments, the first bit field and the second bit field are non-overlapping.

According to another embodiment, a non-transitory storage medium. The non-transitory storage medium comprises an operation lock (OPLOCK), which is a bitmap comprising a plurality of bit fields, each representing one of a plurality of operations that may be performed on a common resource; a first mask bitmap, wherein the first mask bitmap defines a first bit field in the operation lock that is associated with a first operation; a first policy bitmap, wherein the first policy bitmap defines a compatibility between the first operation and each of the plurality of operations; a second mask bitmap wherein the second mask bitmap defines a second bit field in the operation lock that is associated with a second operation; and a second policy bitmap, wherein the second policy bitmap defines a compatibility between the second operation and each of the plurality of operations.

According to another embodiment, a method of controlling access to a common resource, wherein read operations and write operations may be performed on the common resource, and wherein a plurality of tasks may simultaneously perform read operations on the common resource, is disclosed. The method comprises providing an operation lock (OPLOCK), which is a bitmap comprising a read bit field and a write bit field, wherein the read bit field is greater than one bit and the write bit field is exactly one bit; providing a set of read bitmaps, where the read bitmaps correspond to the read operation, wherein the read bitmaps comprise a read mask bitmap and a read policy bitmap, wherein the read mask bitmap defines the read bit field in the operation lock, and the read policy bitmap defines a compatibility between the read operation and the read and write operations; providing a set of write bitmaps, where the set of write bitmaps correspond to the write operation, wherein the set of write bitmaps comprises a write mask bitmap and a write policy bitmap, wherein the write mask bitmap defines the write bit field in the operation lock, and the write policy bitmap defines a compatibility between the write operation and the read and write operations; and determining whether a task may perform a read or write operation on the common resource based on values of the operation lock, the set of read bitmaps and the set of write bitmaps. In certain embodiments, the read policy bitmap indicates that other read operations may be performed while a task is performing a read operation. In some embodiments, a number of tasks that may simultaneously access the common resource to perform read operations is determined by a size of the read bit field.

BRIEF DESCRIPTION OF THE DRAWINGS

For a better understanding of the present disclosure, reference is made to the accompanying drawings, which are incorporated herein by reference and in which.

DETAILED DESCRIPTION

The present disclosure describes an efficient locking mechanism, which may be especially beneficial for use with multi-threaded software. This locking mechanism may be used with any device that includes a processing unit and the memory device.

Figure 1:
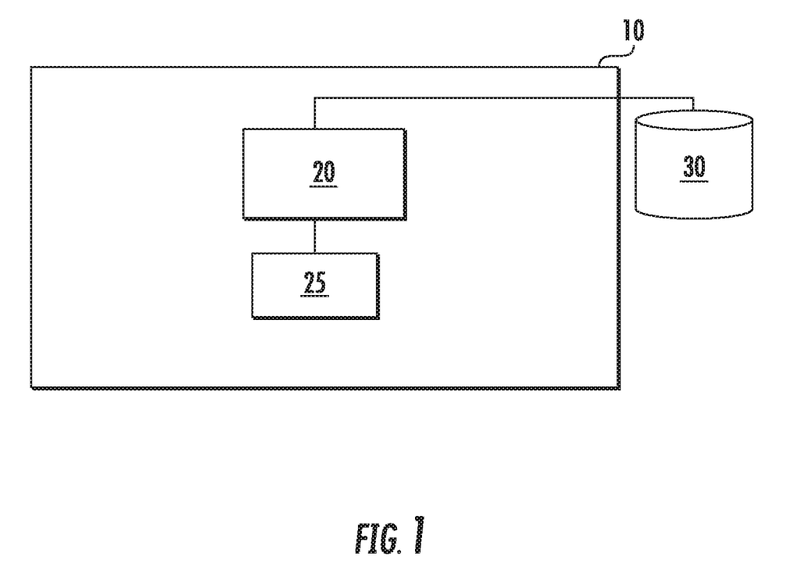
FIG. 1 is a block diagram of a representative device.

For example, FIG. 1 shows a block diagram of a representative device 10, which may utilize the disclosed locking mechanism. The device 10 has a processing unit 20 and an associated memory device 25. This memory device 25 contains the instructions, which, when executed by the processing unit 20, enable the device 10 to perform its intended functions. Included within these instructions is the disclosed locking mechanism. This memory device 25 may be a non-volatile memory, such as a FLASH ROM, an electrically erasable ROM or other suitable devices. In other embodiments, the memory device 25 may be a volatile memory, such as a RAM or DRAM. In certain embodiments, the memory device 25 may be packaged with the processing unit 20. The processing unit 20 may be any suitable device, including but not limited to a general purpose processor, an application specific processor, an embedded controller, or a personal computer (PC).

In certain embodiments, the device 10 may have access to a hardware peripheral, such as storage device 30. This storage device may be a magnetic disk, an optical disk, a FLASH drive, or any other suitable device. In certain embodiments, this storage device may contain a file system. The file system may include files, directories, volumes and other data elements. In other embodiments, the hardware peripheral may be a different type of component.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language and the programming language is not limited by this disclosure. Thus, in some embodiments, there may be multiple computer readable media that contain the instructions described herein. The first computer readable media may be in communication with the processing unit 20, as shown in FIG. 1. The second computer readable media may be a CDROM, or a different memory device, which is located remote from the device 10. The instructions contained on this second computer readable media may be downloaded onto the memory device 25 to allow execution of the instructions by the device 10.

The locking mechanism can be used to govern access to any common resource. In certain embodiments, the common resource may be a file disposed on the storage device 30. In certain embodiments, the common resource may be a data structure that resides in the memory device 25. In other embodiments, the common resource may be some type of hardware peripheral, such as a shared storage device or other hardware component. Thus, the common resource may reside in any memory or storage device and its location is not limited by this disclosure. Further, the common resource may itself be a hardware peripheral that is shared among multiple tasks.

Further, the common resource may be any type and size. For example, the common resource may be a volume on a disk drive, a file on a disk drive, a data structure stored in the memory device 25, or any other item. Thus, the term "common resource" is intended to encompass any data or hardware device that can be accessed by multiple applications or tasks. Further, the term also encompasses any data or hardware peripheral that may be accessed by multiple instantiations of the same application or task.

Figure 2:
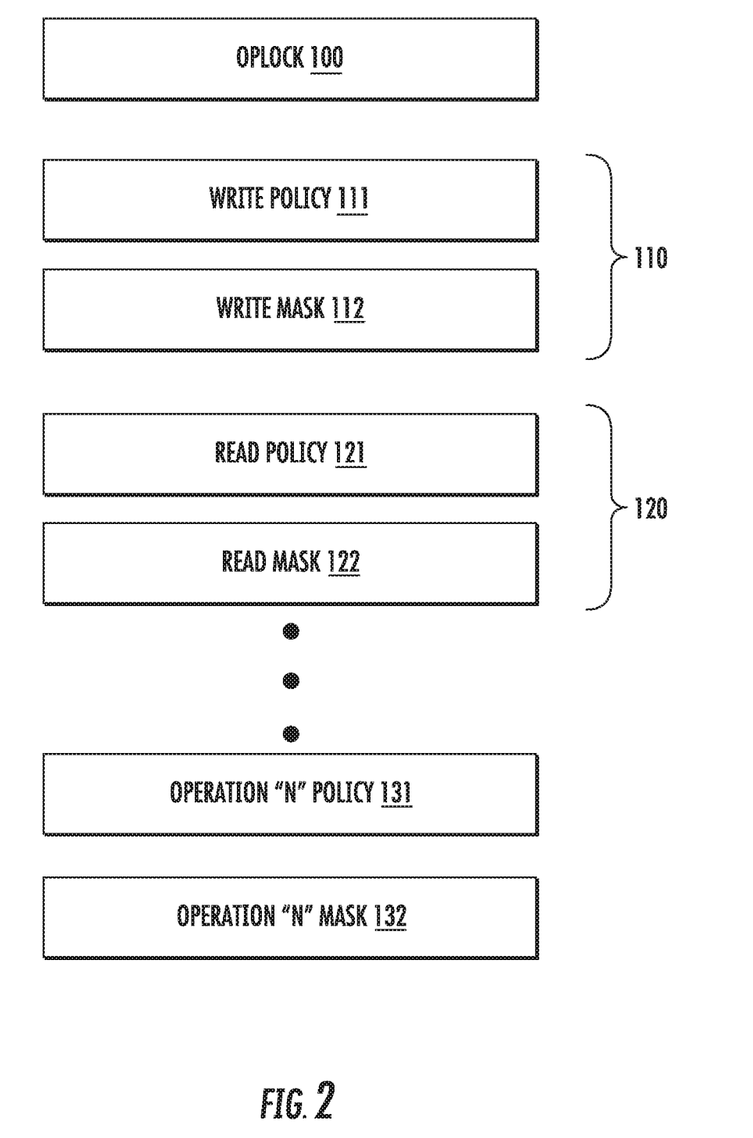
FIG. 2 is an illustration of the locking mechanism according to one embodiment.

The locking mechanism includes several elements, as shown in FIG. 2. There is an operation lock, or OPLOCK 100. The OPLOCK 100 is a bitmap, which may be disposed in the memory device 25, that contains a predetermined number of bits. In certain embodiments, the bitmap may contain 8 bits. In other embodiments, the bitmap may contain up to 64 bits, or more. The OPLOCK 100 is the data structure used to control access to the common resource, as will be described in more detail below. As such, the OPLOCK 100 is a writable and readable data structure. The locking mechanism also includes policy bitmaps and mask bitmaps associated with each operation. Unlike the OPLOCK 100, the policy bitmaps and mask bitmaps are set to predetermined values, which are not changed during operation. Further, there is a separate policy bitmap and a mask bitmap for each supported operation. Supported operations include reads, writes, resets, changes in properties, initiated shutdowns, and others.

For example, FIG. 2 shows a write policy bitmap 111 and a write mask bitmap 112. Together, these two bitmaps are referred to as the write bitmaps 110. Additionally, there are read bitmaps 120, which comprise a read policy bitmap 121 and a read mask bitmap 122. As noted above, this locking mechanism can support an arbitrary number of operations. Thus, FIG. 2 also shows Operation "N" bitmaps 130, made up of Operation "N" policy bitmap 131 and an operation "N" mask bitmap 132. Although only one set of additional operation bitmaps is shown, it is understood that an arbitrary number of operation bitmaps may be included. Further, the OPLOCK 100 and each of these bitmaps have the same number of bits.

Figure 3:
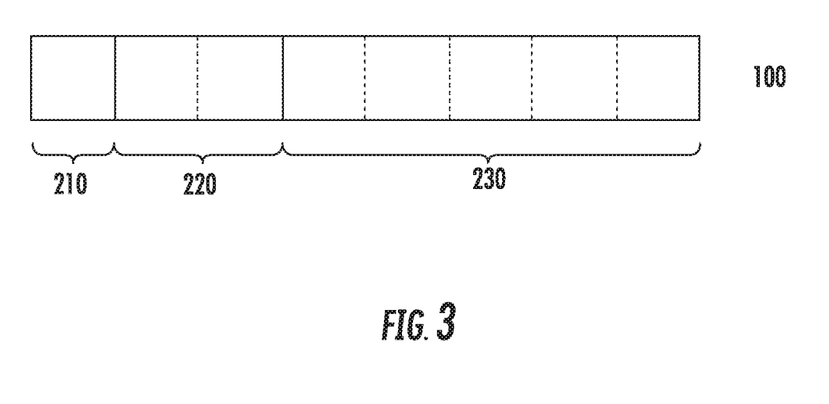
FIG. 3 shows the configuration of each bitmap according to one embodiment.

FIG. 3 shows one arrangement of these various bitmaps. First, all of these bitmaps are divided into smaller bit fields, where each bitfield is made up of a subset of the bits that define each bitmap. Each bit field is associated with a particular operation. In FIG. 3, write bitfield 210 is associated with write operations. Since only one task may write to the common resource at a time, the write bitfield 210 only needs to be one bit in length. Read bitfield 230 is associated with read operations. In this particular example, five bits are used for the read bitfield 230. Thus, $2^5-1$ tasks may read the common resource at the same time. Further, in this embodiment, there is an Operation "N" bitfield 220. This Operation "N" bitfield 220 may be associated with another operation, such as Operation "N". In this example, this Operation "N" bitfield 220 has two bits. Therefore, three tasks are allowed to perform Operation "N" on the common resource at the same time.

Stated differently each operation ($O_i$) is assigned a bitfield within each bitmap, having a size ($B_i$). The size of the bitfield determines the number of tasks ($T_i$) that can perform that operation on the common resource simultaneously, where $T_i=2^{B_i}-1$. Thus, in the example shown in FIG. 3, a write operation ($O_0$) has a write bitfield 210 with 1 bit ($B_0$). Thus, only one task ($T_0$), which equals $2^1-1$, can write at one time. The read operation ($O_1$) has a read bitfield 230 with 5 bits ($B_1$), thereby allowing 31 tasks ($T_1$) to read the common resource simultaneously. Operation "N" ($O_2$) has an Operation "N" bitfield 220 with 2 bits ($B_2$), thereby allowing 3 tasks ($T_2$) to simultaneously perform Operation "N". Again, the number of different operations is not limited by this disclosure, since i can be any positive integer. Further, the sum of all $B_i$ values defines the size of the OPLOCK 100, as well as all of the other bitmaps. In the present example, the sum of $B_0$, $B_1$ and $B_2$ is eight, indicating that the OPLOCK 100 and all of the other bitmaps must also be 8 bits.

Keeping in mind how each bitmap is divided into a plurality of bitfields, the function of the policy bitmaps and mask bitfields will now be defined.

The mask bitmaps, such as write mask bitmap 112 and read mask bitmap 122, simply identify the bitfield that corresponds to this operation. Therefore, referring again to FIG. 3, the write mask bitmap 112 would be 1000 0000, as only the leftmost bit (Bit[7]) is associated with the write operation. Similarly, the read mask bitmap 122 would be 0001 1111, as the rightmost 5 bits (Bits[4:0]) are associated with the read operation. The Operation "N" mask bitmap 132 would be 0110 0000, as the two bits next to the leftmost bit (Bits[6:5]) are associated with Operation "N". Again, any number of operations may be defined using this procedure.

The policy bitmaps, such as write policy bitmap 111 and read policy bitmap 121, define the policy associated with an operation. For example, a write operation cannot occur if any other operation is currently in progress. A read operation can occur if other read operations are currently in progress, but cannot occur if a write operation is currently in progress. Returning to FIG. 3, the write bitfield 210 (i.e. bit[7]) is associated with the write operation, Operation "N" bitfield 220 (i.e. bits[6:5]) is associated with Operation "N" and read bitfield 230 (i.e. bits [4:0]) is associated with the read operation.

Thus, for the write policy bitmap 111, a write cannot occur when any other operation is currently in progress. Thus, every bit in the write policy bitmap 111 is set to a value of "1". In other words, the write policy bitmap 111 is set to 1111 1111. A value of "1" in the policy bitmap indicates that the present operation cannot occur while the corresponding bit of the OPLOCK 100 is set to "1". A value of "0" in the policy bitmap indicates that the present operation can occur while the corresponding bit of the OPLOCK 100 is set to "1".

Next, the read policy bitmap 121 is defined. A read operation may occur if another read operation is occurring, but cannot occur if a write operation is in progress. Further, assume that a read operation may not occur if Operation "N" is in progress. In this example, the write bitfield 210 (i.e. bit[7]) would be set to "1" since reads cannot occur when writes are occurring. The Operation "N" bitfield 220 (i.e. bits[6:5]) would also be set to "1" since reads cannot occur when Operation "N" is occurring. However, the read bitfield 230 (i.e. bits [4:0]) would be set to "0" since read operations may occur when other read operations are occurring. Thus, the read policy bitmap 121 would be set to 1110 0000.

The Operation "N" policy bitmap 131 would be set up in the same manner, with the write bitfield 210 (i.e. bit[7]) set to "1" since Operation "N" cannot occur when a write operation is in progress. The read bitfield 230 (i.e. bits [4:0]) would also be set to "1" since Operation "N" cannot occur when read operations are taking place. Thus, only the Operation "N" bitfield 220 (i.e. bits[6:5]) would be set to "0" in the Operation "N" policy bitmap 131. Thus, the Operation "N" policy bitmap 131 would be set to 1001 1111.

Thus, the policy bitmap for a specific operation defines the compatibility of various operations, where the compatibility of that specific operation with respect to every other operation is defined by bitfields in that bitmap. For example, the read policy bitmap 121 looks at the compatibility of read operations with the other operations, as defined by the bitfields 210, 220, 230. Since read operations are not compatible with write operations, bit[7], which is defined as the write bitfield 210, is set to a "1". Since reads are compatible with read operations, bits[4:0], which is defined as the read bitfield 230, are all set to "0". In this example, since read operations are incompatible with Operation "N", bits [6:5], which is defined as the Operation "N" bitfield 220, are all set to "1".

Figure 5:
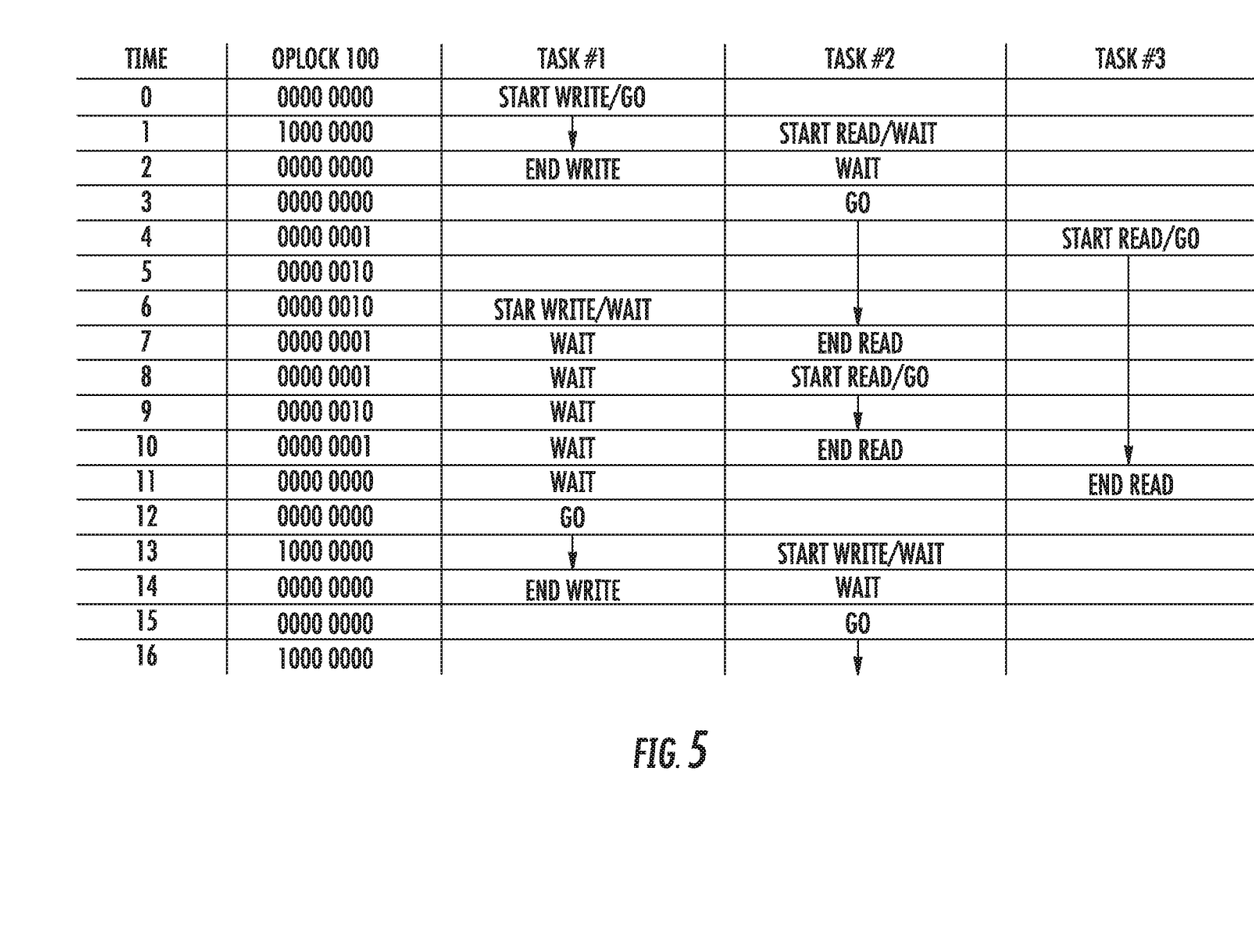
FIG. 5 is a timeline showing the operation of the locking mechanism.

FIG. 5 is used to explain the operation of the OPLOCK 100. In this particular example, the only operations of interest are reads and writes. Thus, only the write bitmaps 110 and the read bitmaps 120 are utilized in this example. Of course, this explanation can be expanded to include any arbitrary number of operations.

Figure 4:
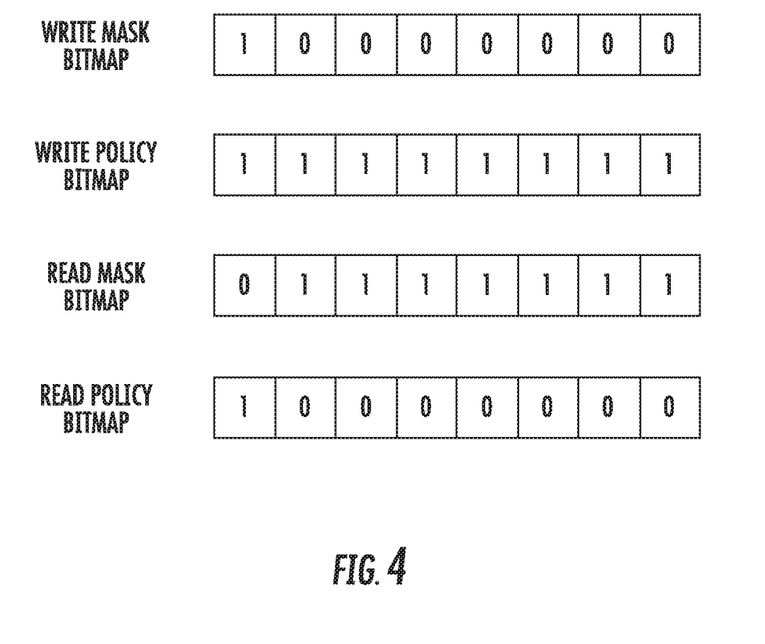
FIG. 4 shows read and write bitmaps for a particular example.

In this example, for simplicity, the OPLOCK 100 is only an 8 bit bitmap. As described above, the write bitfield 210 is only one bit, since only one write is permitted at a time. This leaves 7 bits for the read bitfield 230, thereby allowing 127 simultaneous read operations. The write bitfield 210 is bit[7]; the read bitfield 230 is bits[6:0]. Thus, based on this configuration, the write mask bitmap would be: 1000 0000, while the write policy bitmap would be: 1111 1111. Similarly, the read mask bitmap would be: 0111 1111, while the read policy mask bitmap would be 1000 0000. These bitmaps are shown in FIG. 4, and will be used in the example in FIG. 5.

As seen in FIG. 5, initially, at time 0, the OPLOCK 100 is set to all "0", indicating that no tasks are accessing the common resource. Also, at time 0, task #1 wishes to write to the common resource. Since task #1 wishes to perform a write operation, the write bitmaps are utilized. First, the write policy bitmap is bitwise ANDED with the OPLOCK 100. Since the OPLOCK 100 is initially "0", the result of this operation is "0", indicating that the write operation can proceed. The write bitfield of the OPLOCK 100, which is indicated by the write mask bitmap, is then incremented, indicating that task #1 is writing to the common resource.

Thus, as shown at time 1, the OPLOCK 100 is now 1000 0000. Also at time 1, task #2 wishes to read the common resource. Consequently, it follows the same procedure described above. First, the read policy bitmap is bitwise ANDED with the OPLOCK 100. The result of this operation is non-zero, indicating that the read operation cannot proceed and must wait.

At time 2, task #1 has completed the write operation. Thus, the write bitfield of the OPLOCK 100 (as identified in the write mask bitmap) is decremented. Thus, at time 2, the OPLOCK 100 returns to a value of 0000 0000.

At time 3, task #2, which has been waiting to access the common resource, now determines that it may proceed. Again, this is determined by performing a bitwise AND of the OPLOCK 100 and the read policy bitmap.

At time 4, task #2 can begin the read operation. The read bitfield of the OPLOCK 100, which is indicated by the read mask bitmap, is then incremented to show that another task is reading the common resource. Since the read bitfield of the OPLOCK 100 was previously 000 0000, it is now incremented to 000 0001. Further, at time 4, task #3 indicates that it wants to read the common resource. Again, a bitwise of the OPLOCK 100 and the read policy bitmap is performed, which returns a value of 0. Thus, task #3 may be also to proceed to read the common resource. As described above, in the present example, a total of 127 concurrent read operations can be performed. To insure that this limit is not exceeded, the read mask bitmap may be bitwise ANDED with the OPLOCK 100. This result is then compared to the read mask bitmap. If these values are the same, this indicates that the maximum number of read operations has been met. In this case, task #3 must wait until at least one other task finishes its reading operation. However, in this particular example, task #3 can proceed, as it is only the second task wishing to read the common resource. Consequently, the read bitfield in the OPLOCK 100 is incremented to show that another task is performing a read operation of the common resource.

Thus, at time 5, the OPLOCK 100 has a value of 0000 0010, as both task #2 and task #3 are performing read operations.

At time 6, task #1 determines that is wishes to perform another write operation to the common resource. As explained above, a bitwise AND of the write policy bitmap and the OPLOCK 100 is performed. Since this result is non-zero, task #1 must wait. Thus, the OPLOCK 100 remains unchanged.

At time 7, task #2 has completed its read operation. Thus, to indicate that it is finished, the read bitfield of the OPLOCK 100 is decremented. Thus, the OPLOCK 100 has been changed to a value of 0000 0001. Task #1 must continue to wait, as the bitwise AND of the write policy bitmap and the OPLOCK 100 is still non-zero.

At time 8, task #2 wishes to perform another read operation. Again, as explained above, a bitwise AND of the read policy bitmap and the OPLOCK 100 is performed. Since this result is zero, task #2 may proceed. In other words, even though task #1 has already made a request to perform a write, task #2 is allowed to proceed first since other read operations are already ongoing. Thus, as explained above, the read bitfield of the OPLOCK 100 will be incremented to indicate that another task is reading the common resource. Task #1 continues to wait.

At time 9, the value of the OPLOCK 100 is now 0000 0010, as task #2 is also reading the common resource. Task #1 continues to wait. Task #3 is still reading the common resource.

At time 10, task #2 has completed its reading operation. As explained above, the read bitfield of the OPLOCK 100 will be decremented to reflect that task #2 is finished. The value of OPLOCK 100 is now 0000 0001. Task #1 must continue to wait.

At time 11, task #3 has completed its reading operation. Thus, the read bitfield of the OPLOCK 100 will be updated to reflect this. Its value is now 0000 0000.

At time 12, task #1 will finally be able to access the common resource because the bitwise AND of the write policy mask and the OPLOCK 100 is zero.

At time 13, task #1 begins the write operation. The write bitfield of the OPLOCK 100 is updated to reflect this, and now reads 1000 0000. Also, at time 13, task #2 wishes to perform a write operation. As described above, the write policy bitmap is bitwise ANDED with the OPLOCK 100. Since the result is non-zero, task #2 must wait. Thus, the use of different policy bitmaps allows different behaviors. Note that earlier, task #3 was able to begin reading even though another task was already reading. However, this behavior is not permitted in the case of write operations.

At time 14, task #1 has completed the write operation. The write bitfield of the OPLOCK 100 is decremented to reflect this completion. The OPLOCK 100 is now 0000 0000.

At time 15, task #2 is now able to begin its write operation since the bitwise AND of the OPLOCK and the write policy bitmap is zero.

At time 16, task #2 begin writing and the OPLOCK is incremented to 1000 0000. This sequence may continue using the rules described above.

As is readily understood, the logic and steps described in this example are not limited to only read and write operations. As described above, by introducing a policy bitmap and a mask bitmap for each operation, an arbitrary number of operations may be performed.

In the above example, it is assumed that a task simply waits until it is able to gain access to the common resource. However, in certain embodiments, the task may simply report its inability to access the common resource. Thus, the present locking mechanism simply defines how access to a common resource is managed; it does not dictate how a task responds when access is not granted immediately.

Importantly, the error mechanism shown in FIG. 2 functions regardless of the number of types of operations that are performed. Further, the compatibility between the different operations can be defined using the policy bitmaps. Once the policy bitmaps and mask bitmaps are set up, the locking mechanism works identically for all operations.

For example, the following rules apply regardless of the number or type of operations used. First, the bitwise AND of the OPLOCK 100 and the corresponding policy bitmap will determine whether the present task can possibly access the common resource to perform the desired operation. As an example, if the read policy bitmap AND OPLOCK equals 0, a task may possibly be able to perform a read operation (assuming that the maximum limit has not been reached). If this result is non-zero, a read cannot be performed. Additionally, if the bitwise AND of the OPLOCK and the corresponding mask bitmap equals the corresponding mask bitmap, then the maximum number of tasks are currently performing the operation. As an example, if the read mask bitmap AND OPLOCK equals the read mask bitmap, then the maximum number of tasks are already reading the common resource. Further, when a task does gain access to the common resource, the bitfield in the OPLOCK corresponding to the operation to be done by that task is incremented by 1. As an example, when a task gains access for a read, the read bitfield within the OPLOCK will be incremented. Conversely, when a task has completed its access to the common resource, the bitfield in the OPLOCK corresponding to the operation to be done by that task is decremented by 1. As an example, when a task completes its read access, the read bitfield within the OPLOCK will be decremented. By following this set of rules and properly configuring the policy and mask bitmaps, a locking mechanism may be implemented which allows for customization. Specifically, the number of operations that can be controlled is not limited. Further, the number of tasks that can perform a particular task simultaneously is defined by the locking mechanism. Further, the compatibility between operations can be easily defined.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of controlling access to a common resource, wherein a plurality of operations are configured to be performed on the common resource, comprising:
   providing an operation lock (OPLOCK), which is a bitmap comprising a plurality of bit fields;
   providing a first set of bitmaps, where the first set of bitmaps correspond to a first operation that can be performed on the common resource, wherein the first set of bitmaps comprises a first mask bitmap and a first policy bitmap, wherein the first mask bitmap defines a first bit field in the operation lock that is associated with the first operation, and the first policy bitmap defines a compatibility between the first operation and each of the plurality of operations;
   providing a second set of bitmaps, where the second set of bitmaps correspond to a second operation that can be performed on the common resource, wherein the second set of bitmaps comprises a second mask bitmap and a second policy bitmap, wherein the second mask bitmap defines a second bit field in the operation lock that is associated with the second operation, and the second policy bitmap defines a compatibility between the second operation and each of the plurality of operations; and
   determining whether a task is permitted to perform a first operation on the common resource based on values of the operation lock and the first set of bitmaps,
   wherein a number of tasks configured to simultaneously access the common resource to perform the first operation is determined by a size of the first bit field; and
   wherein access to a task to perform the first operation is granted or denied based on a result of a bitwise AND of the operation lock and the first policy bitmap.

2. The method of claim 1, wherein a value of the first bit field in the operation lock is incremented when a task is granted access to the common resource to perform the first operation.

3. The method of claim 2, wherein the value of the first bit field in the operation lock is decremented when the task previously granted access to the common resource has completed the first operation.

4. The method of claim 1, wherein the operation lock, the first set of bitmaps and the second set of bitmaps are the same number of bits.

5. The method of claim 1, wherein access is granted to a task to perform the first operation if a bitwise AND of the operation lock and the first policy bitmap results in a value of 0.

6. The method of claim 1, wherein access is denied to a task to perform the first operation if a bitwise AND of the operation lock and the first policy bitmap results in a non-zero value.

7. The method of claim 1, wherein the first bit field and the second bit field are non-overlapping.

8. The method of claim 1, wherein the first operation is a read operation, and more than one task is granted access to the common resource to simultaneously perform the first operation.

9. The method of claim 1, wherein second operation is a write operation and only one task is granted access to the common resource to perform the second operation.

10. The method of claim 1, further comprising: providing a third set of bitmaps, where the third set of bitmaps correspond to a third operation that can be performed on the common resource, wherein the third set of bitmaps comprises a third mask bitmap and a third policy bitmap, wherein the third mask bitmap defines a third bit field in the operation lock that is associated with the third operation, and the third policy bitmap defines a compatibility between the third operation and each of the plurality of operations.

11. A non-transitory storage medium, comprising:
   an operation lock (OPLOCK), which is a bitmap comprising a plurality of bit fields, each representing one of a plurality of operations that are configured to be performed on a common resource;
   a first mask bitmap, wherein the first mask bitmap defines a first bit field in the operation lock that is associated with a first operation;
   a first policy bitmap, wherein the first policy bitmap defines a compatibility between the first operation and each of the plurality of operations;
   a second mask bitmap wherein the second mask bitmap defines a second bit field in the operation lock that is associated with a second operation;
   a second policy bitmap, wherein the second policy bitmap defines a compatibility between the second operation and each of the plurality of operations; and
   a software application, where the software application uses the operation lock to determine whether a task is to be granted access to the common resource to perform a particular function, wherein access to a task to perform the first operation is granted or denied based on a result of a bitwise AND of the operation lock and the first policy bitmap and wherein a number of tasks configured to simultaneously access the common resource to perform the first operation is determined by a size of the first bit field.

12. The non-transitory storage medium of claim 11, further comprising a software application, where the software application uses the operation lock to determine whether a task is to be granted access to the common resource to perform a particular function.

13. The non-transitory storage medium of claim 12, wherein the software application increments a value of the first bit field in the operation lock when a task is granted access to the common resource to perform the first operation.

14. The non-transitory storage medium of claim 13, wherein the software application decrements the value of the first bit field in the operation lock is decremented when the task previously granted access to the common resource has completed the first operation.

15. The non-transitory storage medium of claim 12, wherein the operation lock, the first mask bitmap, the first policy bitmap, the second mask bitmap and the second policy bitmap are the same number of bits.

16. The non-transitory storage medium of claim 12, wherein the software application grants access to a task to perform the first operation if a bitwise AND of the operation lock and the first policy bitmap results in a value of 0.

17. The non-transitory storage medium of claim 12, wherein the software application denies access to a task to perform the first operation if a bitwise AND of the operation lock and the first policy bitmap results in a non-zero value.

18. A method of controlling access to a common resource, wherein read operations and write operations are configured to be performed on the common resource, and wherein a plurality of tasks are configured to simultaneously perform read operations on the common resource, comprising:
providing an operation lock (OPLOCK), which is a bitmap comprising a read bit field and a write bit field, wherein the read bit field is greater than one bit and the write bit field is exactly one bit;
providing a set of read bitmaps, where the read bitmaps correspond to the read operation, wherein the read bitmaps comprise a read mask bitmap and a read policy bitmap, wherein the read mask bitmap defines the read bit field in the operation lock, and the read policy bitmap defines a compatibility between the read operation and the read and write operations;
providing a set of write bitmaps, where the set of write bitmaps correspond to the write operation, wherein the set of write bitmaps comprises a write mask bitmap and a write policy bitmap, wherein the write mask bitmap defines the write bit field in the operation lock, and the write policy bitmap defines a compatibility between the write operation and the read and write operations; and
determining whether a task is configured to perform a read or write operation on the common resource based on values of the operation lock, the set of read bitmaps and the set of write bitmaps, wherein a number of tasks configured to simultaneously access the common resource to perform the read operations is determined by a size of the read bit field and wherein access to the task to perform the read operation is granted or denied based on the result of a bitwise AND of the operation lock and the read policy bitmap.

19. The method of claim 18, wherein the read policy bitmap indicates that other read operations are configured to be performed while a task is performing a read operation.

* * * * *